(12) United States Patent
Wollschlager et al.

(10) Patent No.: US 11,411,497 B2
(45) Date of Patent: Aug. 9, 2022

(54) SWITCHING POWER REGULATOR AND METHOD FOR RECOVERING THE SWITCHING POWER REGULATOR FROM AN UNREGULATED STATE

(71) Applicant: NXP USA, INC., Austin, TX (US)

(72) Inventors: Kyle James Wollschlager, Chandler, AZ (US); John Pigott, Phoenix, AZ (US); John Ryan Goodfellow, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 191 days.

(21) Appl. No.: 16/996,261

(22) Filed: Aug. 18, 2020

(65) Prior Publication Data
US 2022/0060109 A1 Feb. 24, 2022

(51) Int. Cl.
*H02M 3/158* (2006.01)
*H02M 1/08* (2006.01)
*H02M 1/36* (2007.01)

(52) U.S. Cl.
CPC ............. *H02M 3/158* (2013.01); *H02M 1/08* (2013.01); *H02M 1/36* (2013.01)

(58) Field of Classification Search
CPC ........... H02M 3/158; H02M 1/08; H02M 1/36
See application file for complete search history.

(56) References Cited

U.S. PATENT DOCUMENTS

| | | | |
|---|---|---|---|
| 5,264,782 A | 11/1993 | Newton | |
| 7,518,348 B1 | 4/2009 | Kobayashi | |
| 10,180,695 B1 | 1/2019 | Bikulcius | |
| 11,050,347 B2* | 6/2021 | Neyra | H02M 1/32 |
| 2012/0169304 A1* | 7/2012 | Isik | H02M 3/07 |
| | | | 323/266 |
| 2014/0217999 A1* | 8/2014 | Wibben | G05F 1/468 |
| | | | 323/282 |

OTHER PUBLICATIONS

U.S. Appl. No. 16/459,542; Inventor, Percy Edgard Neyra et al.; "Dynamic Enhancement of Loop Response Upon Recovery From Fault Conditions;" filed Jul. 1, 2019.

(Continued)

*Primary Examiner* — Thienvu V Tran
*Assistant Examiner* — Bart Iliya
(74) *Attorney, Agent, or Firm* — Daniel D. Hill

(57) ABSTRACT

A switching power regulator and method for recovering the regulator from an unregulated state while preventing overshoot of an output voltage is provided. The regulator includes a dropout detector, a sample-and-hold circuit, a voltage offset circuit and a soft start circuit. When the regulator enters an unregulated state, the dropout detector detects when a pulse width modulation (PWM) signal stops toggling. The sample-and-hold circuit and soft start circuit are used to effectively clamp the voltage at the output of an error amplifier. This causes the output of the error amplifier to regulate around a desired voltage so that the regulator recovers from the unregulated state with little or no overshoot of the output voltage. In another embodiment, a method for recovering from the unregulated state is provided.

20 Claims, 4 Drawing Sheets

(56) References Cited

OTHER PUBLICATIONS

Kim, Dae-Jin et al.; "A Voltage-Mode Buck Converter With a Reduced Type-I Compensation Capacitor Using an Error-Amplifier Current-Sampling Scheme;" Published in: 2019 International Conference on Electronics, Information, and Communication (ICEIC); Auckland, New Zealand; Jan. 22-25, 2019; DOI: 10.23919/ELINFOCOM.2019.8706439.

Sheehan, Robert; "Understanding and Applying Current-Mode Control Theory;" Presented Oct. 31, 2007; Power Electronics Technology Exhibition and Conference, Oct. 30-Nov. 1, 2007, Dallas, Texas.

Yang, Ricky; "Modeling and Control for a Current-Mode Buck Converter with a Secondary LC Filter;" Analog Dialogue, vol. 52, Oct. 2018.

* cited by examiner

SWITCHING POWER REGULATOR AND METHOD FOR RECOVERING THE SWITCHING POWER REGULATOR FROM AN UNREGULATED STATE

BACKGROUND

Field

This disclosure relates generally to electronic circuits and more specifically to a switching power regulator and method for recovering the switching power regulator from an unregulated state.

Related Art

A switching power regulator is a type of DC-to-DC converter for providing a DC (direct current) power supply voltage. A switching regulator that provides a lower output voltage than the input voltage is commonly known as a buck type of regulator. A regulator can drop out of regulation (become unregulated) when a relationship between the input voltage and the output voltage is unfavorable. For example, if the input voltage of a buck type of regulator drops too low, the regulator is said to enter "dropout" where the regulator is unable to regulate the output voltage until the input voltage increases to a voltage where the regulator can again regulate the output voltage.

DC-to-DC switching regulators that use a compensation capacitor to generate a pole in a compensation circuit to set an inductor current are susceptible to overshooting the target output voltage when the DC-to-DC switching regulator attempts to exit from an unregulated condition. The output voltage overshoot may be due to the integrating compensation capacitor remaining charged too long for the conditions. Overshooting the target output voltage may cause the regulated output voltage to exceed the specification set for the regulator. Therefore, what is needed is a way to transition a switching regulator out of dropout without overshooting the target output voltage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
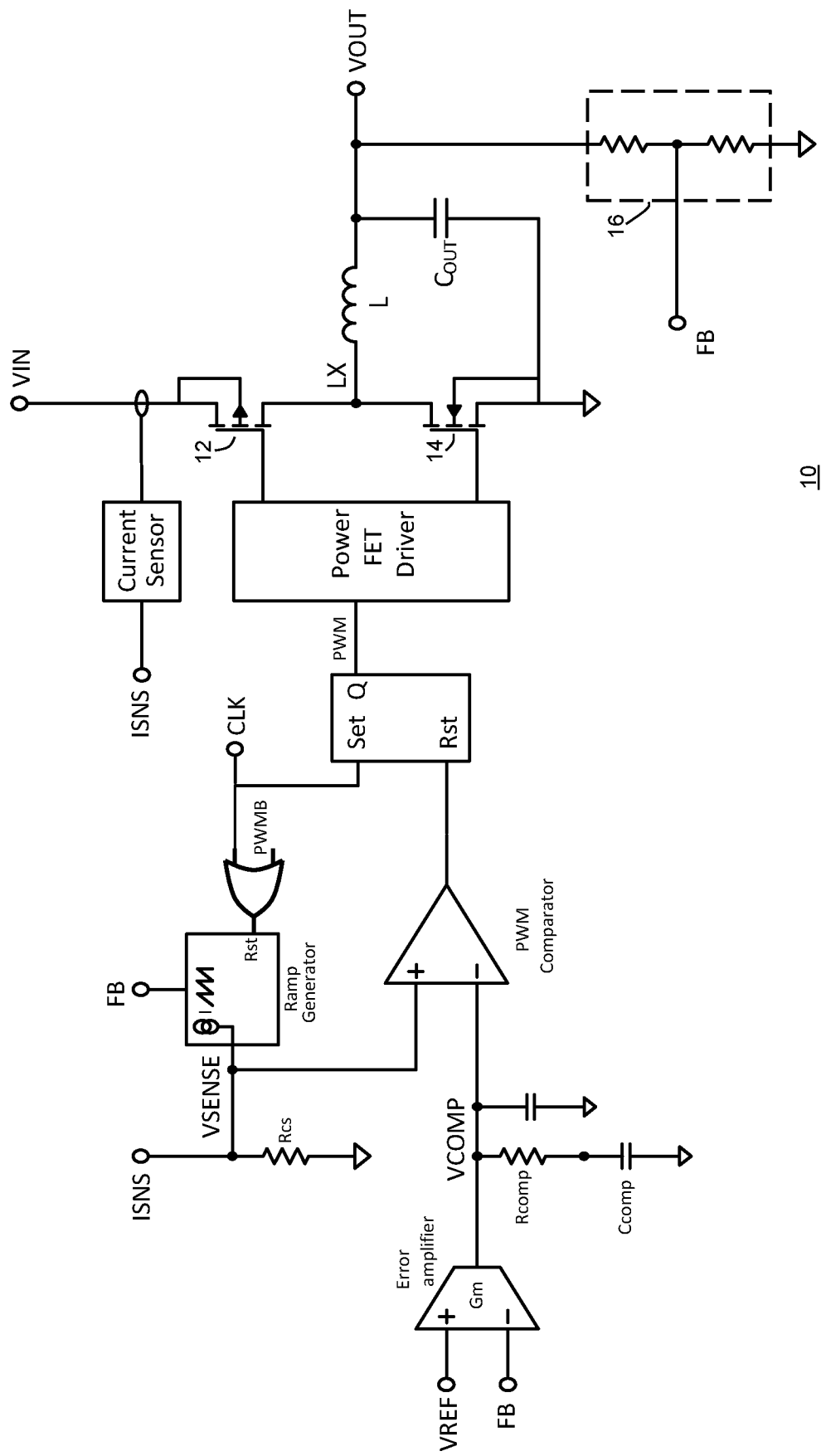
FIG. 1 illustrates a prior art switching power regulator.

Generally, there is provided, a switching power regulator and method for recovering the switching power regulator from an unregulated state. In accordance with an embodiment, the switching power regulator includes a dropout detector, a sample-and-hold circuit, a voltage offset circuit, a soft start circuit, an error amplifier, a comparator, and a pulse width modulation (PWM) comparator. The dropout detector is for detecting when the switching power regulator has entered an unregulated state. When the unregulated state is detected, the dropout detector provides a dropout signal to begin a dropout mode of the switching power regulator. In one embodiment, the dropout detector provides the dropout signal after a predetermined delay. The sample-and-hold circuit samples an output current of the switching power regulator that has been converted to a voltage and combined with slope information. An offset voltage is added to the sampled signal and provided to the comparator to generate a shifted voltage sample. The soft start circuit receives the feedback voltage from an output of the switching power regulator and has an output for providing a soft start voltage. The soft start voltage is initially set to a voltage based on the feedback voltage and then ramped up at a predetermined ramp rate for a predetermined number of clock cycles. The error amplifier is a three input transconductance amplifier (OTA) and has a first input coupled to receive the feedback voltage from the output of the switching power regulator, a second input for receiving the soft start voltage, a third input coupled to receive a reference voltage, and an output for providing a control voltage that regulates the inductor current. The output of the transconductance amplifier is determined by the difference between the feedback and the lower of the reference voltage and the soft start voltage. The soft start voltage is initialized in response to the dropout detector entering the dropout mode. The control voltage (VCOMP) ramps down in response to the soft start voltage.

The comparator receives the shifted voltage sample and causes the dropout detector to exit the dropout mode when the shifted voltage sample exceeds control voltage VCOMP. The PWM comparator has a first input coupled to receive the output current labeled VSENSE of the switching power regulator, a second input coupled to receive the control voltage VCOMP, and an output for providing a PWM drive signal to switching transistors of the switching power regulator, wherein a duty cycle of the PWM drive signal is controlled by a relationship between the output current of the switching power regulator and the control voltage. In another embodiment, a method is provided for recovering the switched power regulator from the unregulated state.

Effectively, the regulator and method result in the output of the error amplifier regulating, or hiccupping, around a desired voltage during dropout that is determined by the sample and hold circuit sampling the actual load current and slope information with an offset voltage that keeps the output of the error amplifier within a desired range of the sample-and-hold signal. The illustrated embodiment detects when the regulator is unable to regulate and keeps the compensation capacitance from being incorrectly overcharged even while the PWM comparator is commanding a 100 percent duty cycle. If the dropout recovery doesn't work the first time, the soft start voltage is re-initialized to the feedback voltage and the soft starting procedure is attempted again. Each soft start attempt begins by initializing the soft start voltage to the feedback voltage and then slowly ramping the soft start voltage. Soft starting attempts continue until the regulator again operates correctly and in regulation.

In one embodiment, there is provided, a switching power regulator including: a dropout detector for detecting when the switching power regulator has entered an unregulated state, and in response, providing a dropout signal to begin a dropout mode of the switching power regulator; a sample-and-hold circuit having a first input coupled to sample an output current of the switching power regulator, and a second input coupled to the dropout detector to receive the dropout signal, and an output for providing a voltage representation of the output current sample; a voltage offset circuit having an input coupled to receive the voltage representation of the output current sample, and an output for providing a shifted voltage sample; a soft start circuit having an input coupled to receive the feedback voltage from an output of the switching power regulator, and an output for providing a soft start voltage, wherein the soft start voltage is initially based on the feedback voltage and ramped up at a predetermined ramp rate; an error amplifier having a first input coupled to receive a feedback voltage from an output of the switching power regulator, a second input for receiving the soft start voltage, a third input coupled to receive a reference voltage, and an output for providing a control voltage, wherein the soft start voltage is provided in response to the dropout detector exiting the dropout mode, and wherein the control voltage rises in response to the lowest voltage of the soft start voltage or the reference voltage; a comparator having a first input coupled to receive the shifted voltage sample, a second input coupled to receive the control voltage, and an output for causing the dropout detector to exit the dropout mode; and a pulse width modulation (PWM) comparator having a first input coupled to receive the output current of the switching power regulator, a second input coupled to receive the control voltage, and an output for providing a PWM drive signal to a switching transistor of the switching power regulator, wherein a duty cycle of the PWM drive signal is controlled by a relationship between the output current of the switching power regulator and the control voltage. The predetermined ramp up rate of the soft start voltage may be programmable. The dropout detector may detect the unregulated state by detecting that the PWM comparator has stopped toggling. The dropout detector may further include a counter for counting a predetermined number of clock cycles before providing the dropout signal. The soft start signal may be set to the feedback voltage at the exit of the dropout mode and provided to the error amplifier with an offset between the feedback voltage and the soft start voltage. The dropout mode may be reentered in response to the dropout detector detecting that the PWM comparator has not resumed toggling in response to the ramping up of the soft start voltage. The voltage representation of the output current may be combined with slope information and sampled by the sample and hold circuit. The switching power regulator may be a buck type regulator.

In another embodiment, there is provided, a method for recovering a switching power regulator from an unregulated state, the method including: detecting that the switching power regulator has entered the unregulated state; entering a dropout mode in response to detecting the unregulated state, the dropout mode comprising; sampling and holding a voltage representation of an output current of the switching power regulator while in the dropout mode; shifting the voltage representation of the output current to produce a shifted voltage representation; and providing the shifted voltage representation to a first comparator; exiting the dropout mode; entering a soft start mode based on an output of the first comparator, the soft start mode including: providing a soft start voltage to an input of an error amplifier, wherein the soft start voltage is initially set based on a feedback voltage from an output of the switching power regulator and then ramped up at a predetermined ramp up rate; and providing an output of the error amplifier to a pulse width modulation (PWM) comparator; and iteratively entering the dropout mode and then the soft start mode until the switching power regulator recovers from the unregulated state. Detecting that the switching power regulator has entered the unregulated state may further include detecting that the PWM comparator has stopped toggling at one hundred percent duty cycle. The predetermined ramp up rate of the soft start voltage may be programmable. The method may further include counting a predetermined number of clock cycles before entering the dropout mode. Initially setting the soft start voltage may further include the soft start signal being initially set to the feedback voltage through a resistor. The dropout mode may be reentered in response to detecting that the PWM comparator has not resumed toggling in response to the ramping up of the soft start voltage. The voltage representation of the output current may be combined with slope information before being sampled by the sample and hold circuit. The switching power regulator may be a buck type regulator.

In yet another embodiment, there is provided, a method for recovering a switching power regulator from an unregulated state, the method including: detecting that the switching power regulator has entered the unregulated state by detecting that a pulse width modulation comparator has stopped toggling; counting a predetermined number of clock cycles after the detecting; entering a dropout mode in response to counting the predetermined number of clock cycles, the dropout mode comprising; converting an output current of the switching power regulator to an output voltage; sampling and holding the output voltage of the switching power regulator while in the dropout mode; shifting the output voltage to produce a shifted output current; and providing the shifter output voltage to a first comparator; exiting the dropout mode; entering a soft start mode based on an output of the first comparator, the soft start mode including: providing a soft start voltage to an input of an error amplifier, wherein the soft start voltage is initially set to a predetermined voltage drop above a feedback voltage from an output of the switching power regulator; ramping up the soft start voltage at a predetermined ramp up rate after initially setting the soft start voltage; providing an output of the error amplifier to a pulse width modulation (PWM) comparator; and detecting when the PWM comparator resumes toggling; and iteratively entering the dropout mode and then the soft start mode until the switching power regulator recovers from the unregulated state. The switching power regulator may be a buck type regulator. The predetermined ramp up rate of the soft start voltage may be programmable. The dropout mode may be reentered in response to detecting that the PWM comparator has not resumed toggling in response to the ramping up of the soft start voltage.

FIG. 1 illustrates a prior art switching power regulator 10. Switching power regulator 10 is a buck type of regulator. Switching transistors 12 and 14 are controlled by a power FET (field effect transistor) driver that receives a pulse width modulation (PWM) signal from a latch. The latch stores a PWM control signal from a PWM comparator. On start-up, P-channel transistor 12 is switched on providing VIN to one side of inductor L at node LX. A duty cycle of the PWM signal determines how long transistor 12 stays on. Current at node LX ramps up relatively linearly. The current from inductor L develops a voltage at the load that is monitored by the error amplifier via a feedback signal "FB" developed using a resistor divider 16. After a time period determined by the duty cycle of the PWM driver, transistor 12 switches off and N-channel transistor 14 switches on, connecting node LX to ground. The on and off cycling of transistors 12 and 14 determines the output voltage VOUT. To regulate VOUT at a certain voltage level, a control voltage labeled "VCOMP" is provided by the error amplifier in response to a difference between a reference voltage labeled "VREF" and the feedback voltage FB. Compensation resistor Rcomp and compensation capacitor Ccomp are connected in series and to the output of the error amplifier and provide compensation. A current sensor senses a load current and provides a sensed current ISNS to an input of a ramp generator and to an input of the PWM comparator. A resistor Rcs converts the sensed current ISNS to a voltage VSENSE having a predetermined slope. Voltage VSENSE is provided to a positive input of the PWM comparator and the output VCOMP from the error amplifier is provided to a negative input of the PWM comparator. A relationship between VSENSE and VCOMP determines the duty cycle of the PWM comparator.

Figure 2:
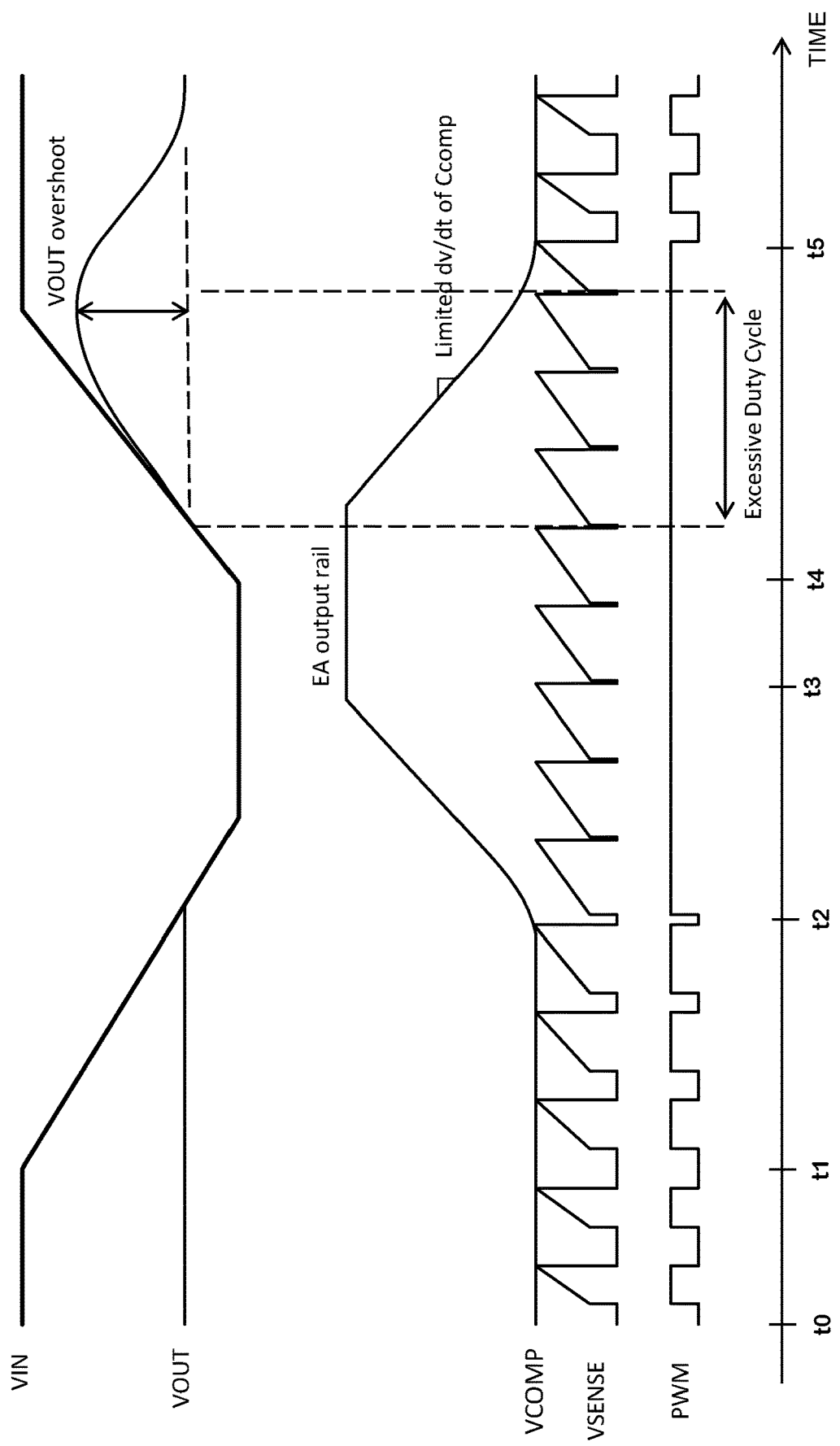
FIG. 2 illustrates a diagram of various signals from the switching power regulator of FIG. 1.

FIG. 2 illustrates a diagram of various signals from switching power regulator 10 of FIG. 1. At time t0, switching power regulator 10 provides a regulated voltage VOUT. At time t1, the input voltage VIN begins to drop. For example, input voltage VIN may drop due to a sudden large increase in load current, a depleted battery, or other reason. At time t2, input voltage VIN has dropped below output voltage VOUT and switching power regulator 10 is no longer able to regulate output voltage VOUT at the predetermined voltage level. Also, at time t2, in an attempt by the error amplifier to recover, the reduced feedback voltage FB results in the output VCOMP of the error amplifier to continue to rise until output VCOMP reaches the voltage of the power supply. The increase in error amplifier output voltage VCOMP increases the duty cycle of the PWM signal until it reaches 100 percent as shown in FIG. 2 between times t2 and t5. That is, the PWM signal has stopped toggling high and low and remains high. At time t4, the output voltage VOUT begins to recover and thus the error amplifier voltage begins to decrease. However, the duty cycle of the PWM is still at 100 percent duty cycle between times t4 and t5. In the illustrated embodiment, the compensation capacitor Ccomp at the output of the error amplifier is an integrating capacitor that maintains high gain and provides good stability. With the large amount of current sense range due to a relatively low current sense gain and a limitation of the error amplifier current to change the compensation capacitance, switching power regulator 10 builds up too much current through inductor L and causes the output voltage VOUT to overshoot as shown between times t4 and t5. The overshooting of the target output voltage VOUT may damage components that were not designed to operate with the higher output voltage.

Figure 3:
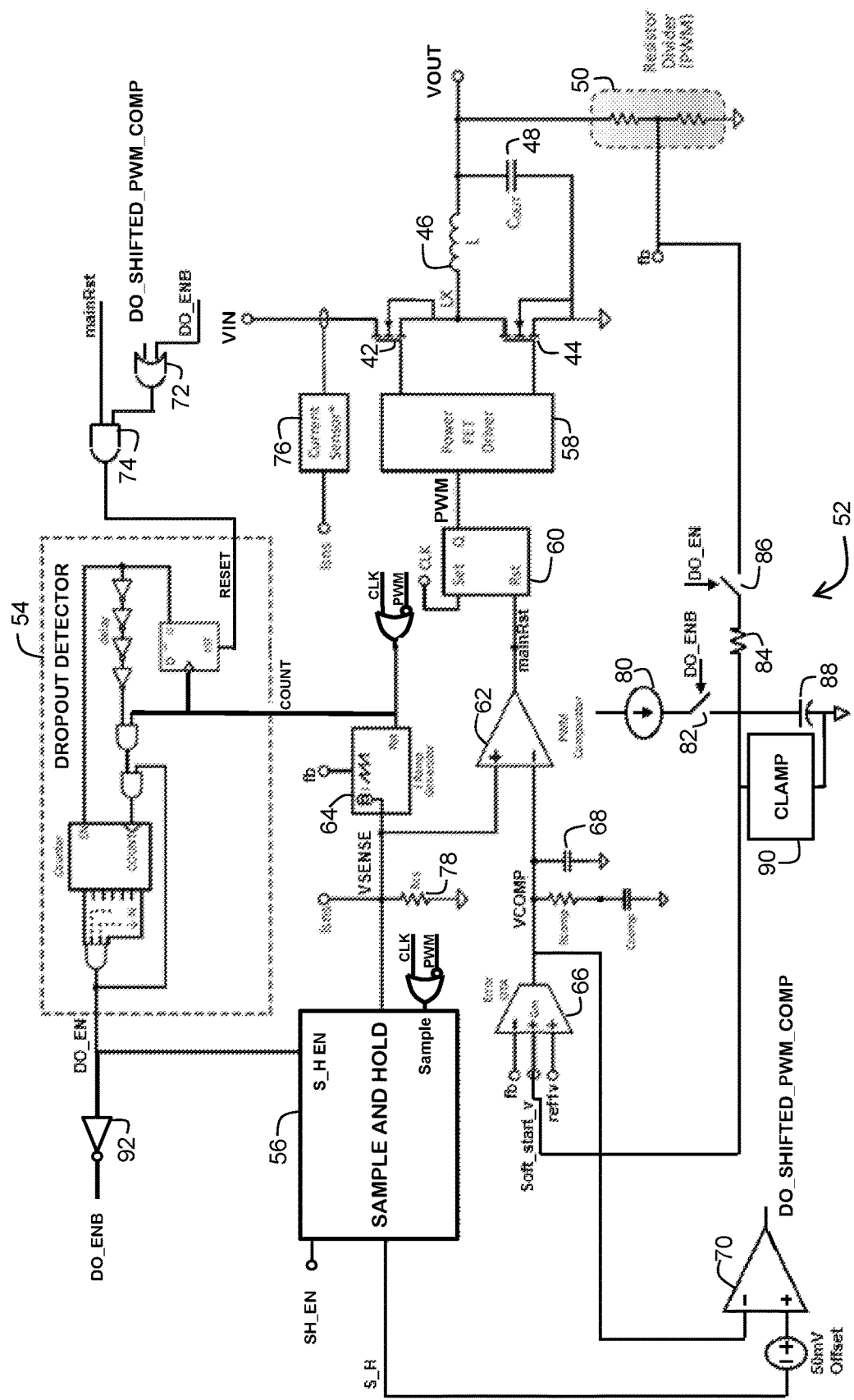
FIG. 3 illustrates a switching power regulator in accordance with an embodiment.

FIG. 3 illustrates switching power regulator 40 in accordance with an embodiment. Switching power regulator 40 is a buck type of regulator. Switching power regulator 40 includes N-channel transistor 42, N-channel transistor 44, inductor 46, capacitor 48, resistor divider 50, soft start circuit 52, dropout detector 54, sample-and-hold circuit 56, power FET driver 58, latch 60, PWM comparator 62, ramp generator 64, error amplifier 66, capacitor 68, resistor Rcomp, compensation capacitor Ccomp, comparator 70, OR logic gate 72, AND logic gate 74, current sensor 76, resistor 78, programmable current source 80, switches 82 and 86, resistor 84, capacitor 88, and clamp 90. Switching power regulator 40 may be implemented in one or more integrated circuits using a conventional semiconductor process technology.

Transistors 42 and 44 are connected in series between an input voltage terminal for receiving input voltage VIN and a ground terminal. Input voltage VIN may be provided by a battery or other power source. A terminal of inductor 46 is connected at node LX at the connection point of transistor 42 to transistor 44. Gates of transistors 42 and 44 are connected to power FET driver 58. An output capacitor 48 is connected to the other terminal of inductor 46 and to ground. Voltage divider 50 includes two series-connected resistors and provides a feedback voltage fb. Soft start circuit 52 includes programmable current source 80, switches 82 and 86, resistor 84, capacitor 88, and clamp 90. A soft start voltage "Soft_start_v" is provided by soft start circuit 52 during a start-up of switching power regulator 40. Dropout detector 54 includes a counter function and delay elements for providing a predetermined delay before asserting dropout enable signal DO_EN. A count signal COUNT is generated from clock signal CLK and the PWM signal and provided to dropout detector 54. Sample-and-hold circuit 56 samples and holds a voltage representation VSENSE of an output current sensed by current sensor 76 and in response to the dropout enable signal DO_EN. Slope information is provided for ramp generator 64.

During normal operation, switching power regulator 40 maintains a predetermined output voltage VOUT by alternately switching transistors 42 and 44 on and off in response to a PWM signal. A duty cycle of the PWM signal is increased when output voltage VOUT drops, and the duty cycle is reduced when the output voltage VOUT is too high. A feedback loop is provided for controlling the PWM duty cycle to regulate output voltage VOUT at a predetermined voltage level. Resistor divider 50 provides a feedback signal fb to an input of error amplifier 66. Error amplifier 66 is a three-input transconductance amplifier and also receives the soft start signal Soft_start_v and a reference voltage "reflv" as illustrated in FIG. 3. When regulator 40 is operating normally and providing a regulated output voltage VOUT (i.e., not in dropout), switch 82 is closed and switch 86 is open, and the soft start signal Soft_start_v is pulled high to a voltage supply potential. The feedback signal fb and reference voltage reflv control the output voltage VCOMP provided by error amplifier 66 during normal operation. Voltage VCOMP is compared to voltage VSENSE by PWM comparator 62 to provide a PWM signal labeled "mainRst" to latch 60. Latch 60 then provides the latched PWM signal PWM to power FET driver 58 in response to the clock signal CLK. The PWM signal PWM has a duty cycle determined by the voltage level of feedback signal fb to regulate output voltage VOUT.

Figure 4:
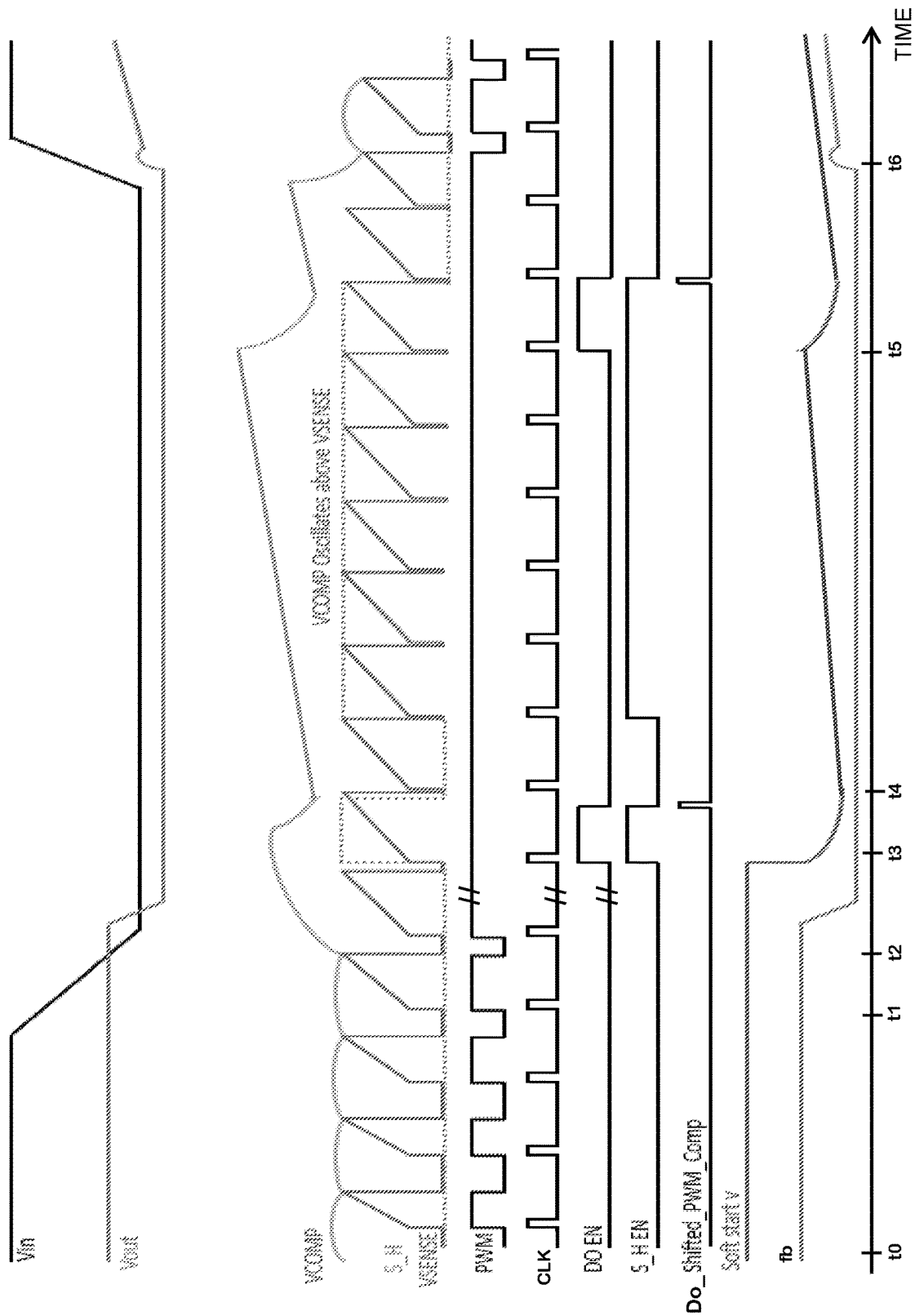
FIG. 4 illustrates a diagram of various signals of the switching power regulator of FIG. 3.

Switching power regulator 40 will enter a dropout mode when the input voltage VIN does not have a predetermined relationship to a target output voltage level for output voltage VOUT. FIG. 4 illustrates a diagram of various signals of switching power regulator 40 for recovering regulation of output voltage VOUT when switching power regulator 40 enters the dropout mode. Referring to FIG. 4, between times t0 and t1, regulator 40 is operating normally. The PWM signal is toggling and output voltage VOUT is regulated at the predetermined level. At time t1, the input voltage VIN begins dropping. Input voltage VIN can drop for any of a variety of reasons as mentioned above. At time t2, input voltage VIN approaches the output voltage VOUT and regulator 40 enters dropout mode. Just after time t2, feedback voltage fb drops and control voltage VCOMP, at the output of error amplifier 66, increases as error amplifier 66 responds to the lowered feedback voltage fb due to the lowered output voltage VOUT. The duty cycle of the PWM signal increases to 100 percent and stops toggling (e.g., remains high), which triggers the counter in dropout detector 54 to begin counting a predetermined number of clock cycles of clock signal CLK. The predetermined number of clock cycles may be, for example, 6 clock cycles. The predetermined number of clock cycles is not shown in FIG. 4 and is represented by the pairs of back slashes (//) in signals PWM, CLK, and DO_EN between times t2 and t3. At time t3, signals DO_EN and S_N EN are asserted and provided to sample-and-hold circuit 56. Sample-and-hold circuit 56 samples voltage VSENSE at the end of the high side ON time of the switching power regulator. Voltage VSENSE is shown in FIG. 4 as a dotted line overlapping sample and hold signal S_H. Voltage VSENSE is provided by a combination of a voltage representation of output current ISNS (converted to a voltage by resistor 78) and slope information provided by ramp generator 64. As can be seen at time t3 and in FIG. 4, signal DO_EN also closes switch 86 and clamp 90 initially reduces the soft_start_v input to within approximately 100 mV of the feedback voltage. Subsequently the soft start_v input of error amplifier 66 decays towards the feedback voltage. Control voltage VCOMP rises in response to the lowest voltage of the soft start voltage or the reference. Error amplifier 66 has a built-in offset voltage (not shown) between feedback signal and signal soft_start_v. This voltage offset causes the error amplifier 66 to pull the VCOMP node down when the feedback signal and soft_start_v are equal. As soft_start_v voltage and the feedback voltage fb get closer to equaling one another, the compensation capacitor Ccomp is pulled down at time t4. At time t3, the sample-and-hold signal S_H is shifted by an offset voltage, for example, in one embodiment, about 50 mV and the signal S_H is provided to an input of comparator 70. Comparator 70 then provides signal DO_Shifted_PWM_COMP to OR logic gate 72 in response to a comparison of VCOMP with the shifted S_H signal. When the Vcomp node is equal to the sample-and-hold signal S_H shifted by the offset voltage, the comparator 70 toggles, which causes the dropout detector 54 to reset via logic gates 72 and 74, which closes switch 82 via the DO_ENB signal. Closed switch 82 allows the soft_start_v voltage to gradually increase at a rate determined by programmable current source 80 and capacitor 88 as shown beginning at time t4. Any conventional circuit for providing programmability of the current source can be used. If the PWM signal continues to be 100 percent and does not toggle, the dropout detector 54 begins to count the predetermined number of clock cycles shown between times t4 and t5. At time t5, the predetermined count is reached causing the dropout detector 54 to set DO_EN high and repeat the dropout enable algorithm. Between times t5 and t6, comparator 70 toggles again resetting the dropout detector which closes switch 82 and begins to increase the soft_start_v voltage. This hiccup mode of operation keeps the output of error amplifier 66 near the sampled current which effectively clamps the output of error amplifier 66 at the desired voltage and allows clean recovery from dropout even when the PWM signal still has a 100 percent duty cycle. In the illustrated embodiment, soft start_v ramps up for 6 clock cycles. In another embodiment, the ramp-up is adjustable, or programmable and can be for a different number of clock cycles. If PWM comparator 62 does not start toggling after the six clock cycles while ramping up the soft start voltage, the logic gates 72 and 74 reset the latch in dropout detector 54 and the cycle repeats as illustrated after time t5. At time t5, dropout enable signal DO_EN is again asserted causing the soft start voltage to be reinitialized to the fb voltage and then ramped up as shown in FIG. 4. When PWM comparator 62 begins toggling as illustrated after time t6, hiccup mode stops, and the soft start voltage continues to ramp up smoothly until regulated operation is entered with very little or no overshoot of output voltage VOUT.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A switching power regulator comprising:
   a dropout detector for detecting when the switching power regulator has entered an unregulated state, and in response, providing a dropout signal to begin a dropout mode of the switching power regulator;
   a sample-and-hold circuit having a first input coupled to sample an output current of the switching power regulator, and a second input coupled to the dropout detector to receive the dropout signal, and an output for providing a voltage representation of the output current sample;
   a voltage offset circuit having an input coupled to receive the voltage representation of the output current sample, and an output for providing a shifted voltage sample;
   a soft start circuit having an input coupled to receive the feedback voltage from an output of the switching power regulator, and an output for providing a soft start voltage, wherein the soft start voltage is initially based on the feedback voltage and ramped up at a predetermined ramp rate;
   an error amplifier having a first input coupled to receive a feedback voltage from an output of the switching power regulator, a second input for receiving the soft start voltage, a third input coupled to receive a reference voltage, and an output for providing a control voltage, wherein the soft start voltage is provided in response to the dropout detector exiting the dropout mode, and wherein the control voltage rises in response to the lowest voltage of the soft start voltage or the reference voltage;

a comparator having a first input coupled to receive the shifted voltage sample, a second input coupled to receive the control voltage, and an output for causing the dropout detector to exit the dropout mode; and a pulse width modulation (PWM) comparator having a first input coupled to receive the output current of the switching power regulator, a second input coupled to receive the control voltage, and an output for providing a PWM drive signal to a switching transistor of the switching power regulator, wherein a duty cycle of the PWM drive signal is controlled by a relationship between the output current of the switching power regulator and the control voltage.

2. The switching power regulator of claim 1, wherein the predetermined ramp up rate of the soft start voltage is programmable.

3. The switching power regulator of claim 1, wherein the dropout detector detects the unregulated state by detecting that the PWM comparator has stopped toggling.

4. The switching power regulator of claim 1, wherein the dropout detector further comprises a counter for counting a predetermined number of clock cycles before providing the dropout signal.

5. The switching power regulator of claim 1, wherein the soft start signal is set to the feedback voltage at the exit of the dropout mode and provided to the error amplifier with an offset between the feedback voltage and the soft start voltage.

6. The switching power regulator of claim 1, wherein the dropout mode is reentered in response to the dropout detector detecting that the PWM comparator has not resumed toggling in response to the ramping up of the soft start voltage.

7. The switching power regulator of claim 1, wherein the voltage representation of the output current is combined with slope information and sampled by the sample and hold circuit.

8. The switching power regulator of claim 1, wherein the switching power regulator is a buck type regulator.

9. A method for recovering a switching power regulator from an unregulated state, the method comprising:
   detecting that the switching power regulator has entered the unregulated state;
   entering a dropout mode in response to detecting the unregulated state, the dropout mode comprising;
      sampling and holding a voltage representation of an output current of the switching power regulator while in the dropout mode;
      shifting the voltage representation of the output current to produce a shifted voltage representation; and
      providing the shifted voltage representation to a first comparator;
   exiting the dropout mode;
   entering a soft start mode based on an output of the first comparator, the soft start mode comprising:
      providing a soft start voltage to an input of an error amplifier, wherein the soft start voltage is initially set based on a feedback voltage from an output of the switching power regulator and then ramped up at a predetermined ramp up rate; and
      providing an output of the error amplifier to a pulse width modulation (PWM) comparator; and
   iteratively entering the dropout mode and then the soft start mode until the switching power regulator recovers from the unregulated state.

10. The method of claim 9, wherein detecting that the switching power regulator has entered the unregulated state further comprises detecting that the PWM comparator has stopped toggling at one hundred percent duty cycle.

11. The method of claim 9, wherein the predetermined ramp up rate of the soft start voltage is programmable.

12. The method of claim 9, further comprising counting a predetermined number of clock cycles before entering the dropout mode.

13. The method of claim 9, wherein initially setting the soft start voltage further comprises the soft start signal being initially set to the feedback voltage through a resistor.

14. The method of claim 9, wherein the dropout mode is reentered in response to detecting that the PWM comparator has not resumed toggling in response to the ramping up of the soft start voltage.

15. The method of claim 9, wherein the voltage representation of the output current is combined with slope information before being sampled by the sample and hold circuit.

16. The method of claim 9, wherein the switching power regulator is a buck type regulator.

17. A method for recovering a switching power regulator from an unregulated state, the method comprising:
   detecting that the switching power regulator has entered the unregulated state by detecting that a pulse width modulation comparator has stopped toggling;
   counting a predetermined number of clock cycles after the detecting;
   entering a dropout mode in response to counting the predetermined number of clock cycles, the dropout mode comprising;
      converting an output current of the switching power regulator to an output voltage;
      sampling and holding the output voltage of the switching power regulator while in the dropout mode;
      shifting the output voltage to produce a shifted output current; and
      providing the shifter output voltage to a first comparator;
   exiting the dropout mode;
   entering a soft start mode based on an output of the first comparator, the soft start mode comprising:
      providing a soft start voltage to an input of an error amplifier, wherein the soft start voltage is initially set to a predetermined voltage drop above a feedback voltage from an output of the switching power regulator;
      ramping up the soft start voltage at a predetermined ramp up rate after initially setting the soft start voltage;
      providing an output of the error amplifier to a pulse width modulation (PWM) comparator; and
      detecting when the PWM comparator resumes toggling; and
   iteratively entering the dropout mode and then the soft start mode until the switching power regulator recovers from the unregulated state.

18. The method of claim 17, wherein the switching power regulator is a buck type regulator.

19. The method of claim 17, wherein the predetermined ramp up rate of the soft start voltage is programmable.

20. The method of claim 17, wherein the dropout mode is reentered in response to detecting that the PWM comparator has not resumed toggling in response to the ramping up of the soft start voltage.

* * * * *